(12) United States Patent
Wake et al.

(10) Patent No.: US 8,722,268 B2
(45) Date of Patent: May 13, 2014

(54) FUEL CELL SYSTEM INCLUDING AN AIR PRESSURE-DRIVEN EJECTOR

(75) Inventors: Chihiro Wake, Saitama (JP); Koichiro Miyata, Saitama (JP); Jumpei Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 397 days.

(21) Appl. No.: 12/787,085

(22) Filed: May 25, 2010

(65) Prior Publication Data

US 2010/0297518 A1 Nov. 25, 2010

(30) Foreign Application Priority Data

May 25, 2009 (JP) ................................. 2009-124952

(51) Int. Cl.
*H01M 8/06* (2006.01)

(52) U.S. Cl.
USPC ........... 429/443; 429/408; 429/513; 429/413; 429/414; 429/415

(58) Field of Classification Search
None
See application file for complete search history.

(56) References Cited

U.S. PATENT DOCUMENTS

| | | | | |
|---|---|---|---|---|
| 7,846,598 | B2 * | 12/2010 | Wake et al. | ................... 429/429 |
| 2002/0106547 | A1 * | 8/2002 | Sugawara et al. | ................ 429/34 |
| 2002/0142197 | A1 | 10/2002 | Kato et al. | |
| 2005/0170223 | A1 * | 8/2005 | Okazaki | .......................... 429/13 |
| 2009/0155092 | A1 | 6/2009 | Fukuma | |
| 2009/0226783 | A1 * | 9/2009 | Hasegawa | ....................... 429/25 |

FOREIGN PATENT DOCUMENTS

| | | |
|---|---|---|
| JP | 2006-250000 | 9/2006 |
| JP | 2008-112585 | 5/2008 |
| WO | 2007/013453 A1 | 2/2007 |

OTHER PUBLICATIONS

Benziger, et al. AlChE Journal, 54 (5) 1313-1332 (2008).*
European Search Report for Application No. 10163735.3, dated Sep. 1, 2010.

* cited by examiner

*Primary Examiner* — Ula C Ruddock
*Assistant Examiner* — Lisa S Park Gehrke
(74) *Attorney, Agent, or Firm* — Nelson Mullins Riley & Scarborough LLP; Anthony A. Laurentano

(57) ABSTRACT

A fuel cell system comprises a fuel cell stack, a cell voltage monitor, a hydrogen tank, a hydrogen supply channel, an ejector, a hydrogen off-gas channel, a purge valve, a compressor, an air supply channel, a pressure control unit for controlling air pressure, a pilot pressure input channel branching off from the air supply channel and inputting the air pressure to the ejector as pilot pressure, and a control unit for controlling the purge valve and the pressure control unit. The ejector includes a pressure control mechanism which increases the ejector's secondary-side pressure by increasing the area of the nozzle's ejecting hole when the pilot pressure input from the pilot pressure input channel rises. When electricity generation status of the fuel cell stack is judged to be poor, the control unit opens the purge valve after raising the air pressure and the pilot pressure by using the pressure control unit.

14 Claims, 8 Drawing Sheets

FUEL CELL SYSTEM INCLUDING AN AIR PRESSURE-DRIVEN EJECTOR

CROSS-REFERENCE TO RELATED APPLICATION

The present application claims benefit of the filing dates of Japanese Patent Application No. 2009-124952 filed on May 25, 2009 which is incorporated herein by reference.

BACKGROUND OF THE INVENTION

1. Field of the Invention

The present invention relates to a fuel cell system.

2. Description of Related Art

In recent years, fuel cells, which generate electricity by using hydrogen (fuel gas) supplied to anodes and air containing oxygen (oxidizer gas) supplied to cathodes, has been developed and are expected as electric power sources for vehicles (e.g., fuel cell electric vehicles), etc.

As the electricity generation by such the fuel cell progresses, water vapor (water) is generated at the cathode of each MEA (Membrane Electrode Assembly) of the fuel cell, and part of the generated water permeates the MEA and then cross-leaks to the anode channel (fuel gas channel). Also, part of the cross-leaked water remains in the anode channel and adheres to the surface of the MEA, etc. The water adhering to the surface of the MEA obstructs the supply of hydrogen (fuel gas) to the anode (catalysts forming the anode). Consequently, the voltage (output) of the fuel cell can fall below a target voltage and electricity generation status of the fuel cell can degenerate to a poor condition.

In a technique proposed to solve the above problem, when the electricity generation status of a fuel cell has degenerated to a poor condition as above, gas and moisture remaining in the anode channel are purged (discharged) to the outside by temporarily raising the gas pressure in the anode channel and then briefly opening a purge valve (discharge valve) placed downstream of the anode channel (see JP 2008-112585 A).

SUMMARY OF THE INVENTION

However, in JP 2008-112585 A, since the gas pressure in the anode channel (anode pressure) is controlled by an ejector driven by a solenoid, the ejector of the fuel cell system has to be equipped with an electromagnetic driving unit such as a solenoid.

It is, therefore, an object of the present invention to provide a fuel cell system capable of efficiently purging the moisture from the fuel cell, while also realizing a simplified configuration of the system.

In accordance with an aspect of the present invention, there is provided a fuel cell system comprising: a fuel cell which includes a fuel gas channel and an oxidizer gas channel and generates electricity by using fuel gas supplied to the fuel gas channel and oxidizer gas supplied to the oxidizer gas channel; an electricity generation status detecting unit which detects electricity generation status of the fuel cell; a fuel gas supply unit which supplies the fuel gas; a fuel gas supply channel which connects the fuel gas supply unit and an inlet of the fuel gas channel; an ejector which is attached to the fuel gas supply channel; a fuel off-gas channel which connects an outlet of the fuel gas channel and the ejector; a discharge valve which is connected to the fuel off-gas channel and is opened for discharging gas in the fuel off-gas channel to the outside; an oxidizer gas supply unit which supplies the oxidizer gas; an oxidizer gas supply channel which connects the oxidizer gas supply unit and an inlet of the oxidizer gas channel; a pressure control unit which controls pressure of the oxidizer gas in the oxidizer gas channel; a pilot pressure input channel which branches off from the oxidizer gas supply channel and inputs the pressure of the oxidizer gas to the ejector as a pilot pressure; and a control unit which controls the discharge valve and the pressure control unit. The ejector includes a nozzle which ejects the fuel gas supplied from the fuel gas supply unit, a needle which is placed coaxially with the nozzle, a diffuser in which the fuel gas ejected from the nozzle and fuel off-gas from the fuel off-gas channel are mixed together, and a pressure control mechanism which increases the ejector's secondary-side pressure by increasing area of the nozzle's ejecting hole when the pilot pressure input from the pilot pressure input channel rises. When electricity generation status of the fuel cell detected by the electricity generation status detecting unit is judged to be poor, the control unit opens the discharge valve after raising the pressure of the oxidizer gas and the pilot pressure by using the pressure control unit.

In the fuel cell system configured as above, the ejector's secondary-side pressure (i.e., gas pressure in the fuel gas channel downstream of the ejector) is controlled by the ejector including the pressure control mechanism. That is, when the pilot pressure input from the pilot pressure input channel rises, the secondary-side pressure is increased by the pressure control mechanism by increasing the area of the nozzle's ejecting hole. Conversely, when the pilot pressure input from the pilot pressure input channel drops, the secondary-side pressure is decreased by the pressure control mechanism by decreasing the area of the nozzle's ejecting hole.

Also, when the electricity generation status of the fuel cell is judged to be poor, the control unit raises the pressure of the oxidizer gas by using the pressure control unit. The increase in the pressure of the oxidizer gas causes an increase in the pilot pressure input to the ejector via the pilot pressure input channel, an increase in the area of the nozzle's ejecting hole, an increase in the flow rate of the fuel gas ejected from the nozzle, and an increase in the ejector's secondary-side pressure (i.e., gas pressure in the fuel gas channel downstream of the ejector).

In this state in which the gas pressure in the fuel gas channel has been raised, the control unit opens the discharge valve, by which moisture (water vapor) remaining in the fuel gas channel and moisture (moisture condensation) adhering to the surfaces of the MEAs of the fuel cell and the inner wall of the fuel gas channel are quickly discharged to the outside via the opened discharge valve together with gas remaining in the fuel gas channel. Consequently, the fuel gas is efficiently supplied to the anodes of the MEAs without being obstructed by the moisture, the electrode reaction at the anodes progresses excellently, and the electricity generation status of the fuel cell quickly recovers from the poor condition.

Since the fuel cell system is equipped not with an electromagnetic driving unit (e.g., solenoid) but with the air pressure-driven ejector (driven by the pilot pressure) as above, the system can be implemented in a simple configuration. Further, differently from the electromagnetic driving unit, the air pressure-driven ejector consumes no electric power for the pressure control of the fuel gas.

Also, the fuel cell system further comprises a flow rate control unit which controls a flow rate of the oxidizer gas flowing through the oxidizer gas channel. The control unit raising the pressure of the oxidizer gas by using the pressure control unit also raises the flow rate of the oxidizer gas by using the flow rate control unit so that moisture remaining in the oxidizer gas channel is discharged.

In the fuel cell system configured as above, when the control unit raises the pressure of the oxidizer gas by using the pressure control unit, the control unit also raises the flow rate of the oxidizer gas by using the flow rate control unit, by which moisture (water vapor, moisture condensation, etc.) remaining in the oxidizer gas channel is discharged to the outside. Consequently, the oxidizer gas is efficiently supplied to the cathodes of the MEAs without being obstructed by the moisture, the electrode reaction at the cathodes progresses excellently, and the electricity generation status of the fuel cell quickly recovers from the poor condition.

Also, the fuel cell system further comprises a pressure sensor which detects gas pressure downstream of the ejector. When the electricity generation status of the fuel cell is judged to be poor, the control unit opens the discharge valve after the gas pressure detected by the pressure sensor has reached a first pressure which is higher than a normal pressure calculated based on an electricity generation demand level.

In the fuel cell system configured as above, the discharge valve is opened after the gas pressure detected by the pressure sensor has reached the first pressure which is higher than the normal pressure, by which the moisture remaining in the fuel gas channel can be discharged efficiently and reliably. That is, whether the gas pressure in the fuel gas channel downstream of the ejector has reached the first pressure which is higher than the normal pressure or not can be checked by the pressure sensor.

Also, when the electricity generation status of the fuel cell is judged to be poor, the control unit opens the discharge valve after a first time period, which is necessary for raising gas pressure downstream of the ejector to a first pressure which is higher than a normal pressure calculated based on an electricity generation demand level, has elapsed since the start of the raising of the oxidizer gas pressure by the pressure control unit.

In the fuel cell system configured as above, the discharge valve is opened after the first time period (necessary for raising the gas pressure downstream of the ejector to the first pressure which is higher than the normal pressure) has elapsed since the start of the raising of the oxidizer gas pressure by the pressure control unit, by which the moisture remaining in the fuel gas channel can be discharged efficiently and reliably.

In addition, the first time period is set at a time period necessary for raising the gas pressure downstream of the ejector (i.e., gas pressure in the fuel gas channel) to the first pressure which is higher than the normal pressure, by conducting pretests, simulation, etc.

Also, the fuel cell system further comprises a temperature sensor which detects system temperature or ambient temperature of the fuel cell system. When the electricity generation status of the fuel cell is judged to be poor and the temperature detected by the temperature sensor is equal to or lower than a prescribed temperature, the control unit opens the discharge valve after letting the gas pressure downstream of the ejector reach a second pressure which is higher than the first pressure.

Here, as the system temperature or the ambient temperature of the fuel cell system falls, the probability of subsequent condensation of the water vapor remaining in the fuel gas channel increases.

Therefore, in the fuel cell system configured as above, when the electricity generation status of the fuel cell is judged to be poor and the temperature detected by the temperature sensor is equal to or less than the prescribed temperature, the control unit opens the discharge valve after letting the gas pressure downstream of the ejector (i.e., gas pressure in the fuel gas channel) reach the second pressure which is higher than the first pressure, by which a greater amount of moisture can be discharged and the subsequent condensation of the water vapor in the fuel gas channel can be reduced.

In addition, the prescribed temperature is set at a temperature below which subsequent condensation of the water vapor can cause poor electricity generation status of the fuel cell, by conducting pretests, etc.

Also, the fuel cell system further comprises an electricity generation duration judgment unit which judges whether or not electricity generation duration from the start to the end of the electricity generation by the fuel cell is equal to or less than a prescribed time period. When the electricity generation status of the fuel cell is judged to be poor, the temperature detected by the temperature sensor is equal to or less than the prescribed temperature, and the electricity generation duration is judged by the electricity generation duration judgment unit to be equal to or less than the prescribed time period, the control unit opens the discharge valve after letting the gas pressure downstream of the ejector reach a third pressure which is higher than the second pressure.

Here, as the electricity generation duration of the fuel cell gets extremely short, the moisture caused by the electricity generation tends to remain intact in the fuel gas channel and the oxidizer gas channel (due to an extremely small total amount of fuel gas and oxidizer gas already flowed through the fuel cell) and the amount of moisture currently remaining in the fuel gas channel and the oxidizer gas channel increases. Especially when the current system temperature or ambient temperature of the fuel cell system is equal to or less than the aforementioned prescribed temperature, a great amount of moisture subsequently remaining in the channels tends to condense and cause poor electricity generation status of the fuel cell.

Therefore, in the fuel cell system configured as above, when the electricity generation status of the fuel cell is judged to be poor, the temperature detected by the temperature sensor is judged to be equal to or less than the prescribed temperature, and the electricity generation duration is judged by the electricity generation duration judgment unit to be equal to or less than the prescribed time period, the control unit opens the discharge valve after letting the gas pressure downstream of the ejector (i.e., gas pressure in the fuel gas channel) reach the third pressure which is higher than the second pressure, by which a greater amount of moisture can be discharged and the subsequent moisture condensation in the fuel gas channel (leading to poor electricity generation status) can be reduced more efficiently.

In addition, the prescribed time period is set at a time period indicative of an extremely small total amount of fuel gas and oxidizer gas flowing through the fuel cell and a large amount of moisture remaining in the fuel cell, by conducting pretests, etc.

Other objects, features and advantages of the present invention will become more apparent from the consideration of the following detailed description taken in conjunction with the accompanying drawings.

DETAILED DESCRIPTION OF THE EMBODIMENTS

Figure 1:
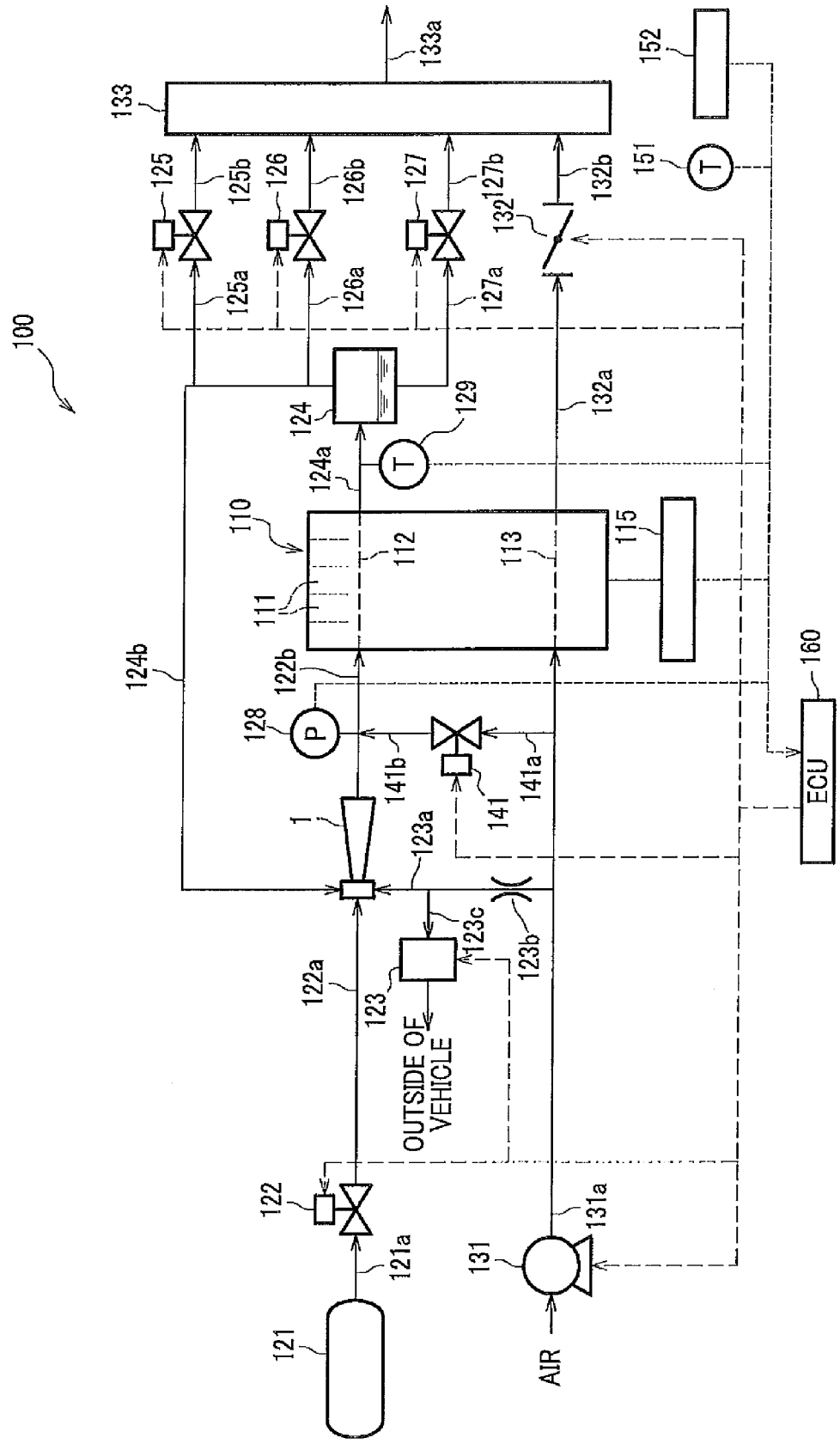
FIG. 1 is a schematic diagram showing the configuration of a fuel cell system in accordance with an embodiment of the present invention.

Referring now to the drawings, a description will be given in detail of a preferred embodiment in accordance with the present invention.

<<Configuration of Fuel Cell System>>

FIG. 1 shows the configuration of a fuel cell system 100 in accordance with an embodiment of the present invention. The fuel cell system 100 shown in FIG. 1 is mounted on a vehicle (e.g., fuel cell electric vehicle, not shown). The fuel cell system 100 includes a fuel cell stack 110, a cell voltage monitor 115, an anode system for supplying and discharging hydrogen (fuel gas, reactant gas) to/from the anodes of the fuel cell stack 110, a cathode system for supplying and discharging air containing oxygen (oxidizer gas, reactant gas) to/from the cathodes of the fuel cell stack 110, a scavenging gas introducing system for introducing scavenging gas from the cathode system to the anode system at the time of scavenging the fuel cell stack 110, and an Electronic Control Unit (ECU) 160 for electronically controlling the above components of the fuel cell system 100.

<Fuel Cell Stack>

The fuel cell stack 110 is formed by stacking a plurality of (200-400, for example) single cells 111 of the so-called solid polymer type (polymer electrolyte type). The single cells 111 in the fuel cell stack 110 are electrically connected in series. Each single cell 111 includes a Membrane Electrode Assembly (MEA) and two electrically conductive separators for sandwiching the MEA. The MEA includes an anode (electrode), a cathode (electrode) and an electrolyte film (solid polymer film) which is formed of a univalent cation exchange membrane, for example, and is sandwiched between the electrodes.

Each electrode (anode, and cathode) includes a porous body having electrical conductivity (e.g., carbon paper) and catalysts (Pt, Ru, etc.) held by the porous body for causing the electrode reaction (chemical reaction at the anode/cathode).

Each separator has grooves which are used for supplying hydrogen or air to the whole surface of the MEA and communicating holes which are used for supplying and discharging hydrogen or air to/from all the single cells 111. The grooves and communicating holes function as an anode channel 112 (fuel gas channel) and a cathode channel 113 (oxidizer gas channel) of the fuel cell stack 110.

Also, when hydrogen is supplied to each anode via the anode channel 112, the following electrode reaction (1) occurs at each anode. Meanwhile, when air is supplied to each cathode via the cathode channel 113, the following electrode reaction (2) occurs at each cathode. Due to the electrode reactions (1) and (2), a potential difference (Open Circuit Voltage (OCV)) occurs in each single cell 111.

$$2H_2 \rightarrow 4H^+ + 4e^- \qquad (1)$$

$$O_2 + 4H^+ + 4e^- \rightarrow 2H_2O \qquad (2)$$

Subsequently, when the fuel cell stack 110 in this state is electrically connected to an external load (e.g., motor) and electric current is drawn from the stack, the fuel cell stack 110 starts generating and outputting electricity.

<Cell Voltage Monitor>

The cell voltage monitor 115 (electricity generation status detecting unit) is an instrument for detecting the cell voltage of each of the single cells 111 forming the fuel cell stack 110. The cell voltage monitor 115 includes a monitor main unit and a wire harness for connecting the monitor main unit to each single cell 111. The monitor main unit scans all the single cells 111 at prescribed periods, detects the cell voltage of each single cell 111, and figures out the average cell voltage and the lowest cell voltage of the single cells 111. Thereafter, the monitor main unit (cell voltage monitor 115) outputs the average cell voltage and the lowest cell voltage to the ECU 160.

Here, the cell voltage monitor 115 has the function of detecting the electricity generation status of the fuel cell stack 110 (electricity generation status detecting function) since the average cell voltage and the lowest cell voltage are parameters those depend on the electricity generation status of the fuel cell stack 110.

In this connection, as the moisture (water vapor, moisture condensation) remaining in the anode channel 112 and the cathode channel 113 increases and the moisture condensation adheres to the surface of the MEA, the supply of hydrogen to the anode and the supply of air to the cathode are obstructed. In this state, the average cell voltage and the lowest cell voltage start dropping and the electricity generation status of the fuel cell stack 110 approaches a poor condition (malfunction).

<Anode System>

The anode system includes a hydrogen tank 121 (fuel gas supply unit), a shut-off valve 122 which is normally closed, an ejector 1, a gas-liquid separator 124, a purge valve (discharge valve) 125 which is normally closed, a scavenging gas discharge valve (discharge valve) 126 which is normally closed, a drain valve (discharge valve) 127 which is normally closed, a pressure sensor 128, and a temperature sensor 129.

<Anode System—Upstream Part>

The hydrogen tank 121 is connected to the inlet of the anode channel 112 via tubing 121a, the shut-off valve 122, tubing 122a, the ejector 1 and tubing 122b. Also, when the shut-off valve 122 is opened by an instruction from the ECU 160, hydrogen is supplied from the hydrogen tank 121 to the anode channel 112 through the shut-off valve 122, etc.

That is, a hydrogen supply channel (fuel gas supply channel) connecting the hydrogen tank 121 and the inlet of the anode channel 112 is formed by the tubing 121a, 122a and 122b, etc. Also, the ejector 1 is attached to the hydrogen supply channel.

<Ejector>

Here, a specific example of the structure of the ejector 1 will be explained with reference to FIGS. 2 and 3.

The ejector 1 has the function of drawing in the anode-off-gas by using negative pressure caused by the ejection of hydrogen (supplied from the hydrogen tank 121) from its nozzle 11, mixing the anode-off-gas with the ejected hydrogen in its diffuser 41, and then supplying the mixed fluid (mixture of hydrogen and anode-off-gas) to the anode channel 112.

Also, the ejector 1 has the function of controlling the pressure of the fluid downstream of the nozzle 11 (secondary-side pressure), that is, the gas pressure in the anode channel 112 (anode pressure), by changing the area of the nozzle's ejecting hole 12 by shifting the nozzle 11 in the axial direction relative to a fixed needle 21 based on the pilot pressure input from the cathode system.

That is, the ejector 1 is not a solenoid-driven ejector (ejector driven by an electromagnetic driving unit) but an air pressure-driven ejector, which controls the secondary-side pressure by means of the mechanical displacement of the nozzle 11 based on the input pilot pressure.

The ejector 1 having the above functions includes, for example, the nozzle 11, the needle 21, a first body 31, a second body 32, the diffuser 41, a first diaphragm 51, a second diaphragm 52, a first compression coil spring 61 and a second compression coil spring 62.

Also, the space inside the ejector 1 is partitioned by the first and second diaphragms 51 and 52 into three chambers: a first chamber A1 in the first body 31 into which the hydrogen from the hydrogen tank 121 flows, a second chamber A2 (mixing chamber) in the diffuser 41 in which the hydrogen ejected from the nozzle 11 is mixed with the anode-off-gas, and a third chamber A3 (pilot chamber) in the second body 32 into which the air from the cathode system flows.

The needle 21 is fixed to the first and second bodies 31 and 32 via a ring-shaped bracket 22 and thereby held in a fixed state. Incidentally, a plurality of communicating holes (not shown) in the axial direction are formed through the bracket 22, by which the right and left spaces of the bracket 22 shown in FIGS. 2 and 3 communicate with each other and both of the spaces are the first chambers A1.

Also, the needle 21 includes a trunk portion 23 substantially in a cylindrical shape (having a channel 25 inside) and a tip portion 24 in a needle-like shape formed at one end (front end) of the trunk portion 23. By shifting the nozzle 11 relative to the tip portion 24, the area of the ejecting hole 12 of the nozzle 11 is changed. In addition, a bearing 26 for determining the position relative to the nozzle 11 in the radial direction is attached to the outer surface of the trunk portion 23.

Further, the hydrogen supplied from the hydrogen tank 121 flows into the channel 25 via an inlet port 33 of the first body 31, the ring-shaped first chamber A1 and communicating holes 27 which are formed through the circumferential wall of the trunk portion 23 at 90-degree intervals in the circumferential direction.

Subsequently, the hydrogen flows through the channel 25 toward the tip portion 24 of the needle 21, flows into the nozzle 11 through communicating holes 28 in slot-like shapes (oblong hole-like shapes) formed at the front end of the trunk portion 23 at 90-degree intervals in the circumferential direction, and is ejected from the ejecting hole 12 of the nozzle 11 to the second chamber A2. Incidentally, the ejector 1 in this embodiment is so designed that the hydrogen can progress in the axial direction across the bearing 26 by flowing through the channel 25.

Also, the ejection of the hydrogen from the nozzle 11 to the second chamber A2 causes negative pressure in the second chamber A2, by which the anode-off-gas is drawn into the second chamber A2 through an inlet port 42 of the diffuser 41. Next, the ejected hydrogen and the introduced anode-off-gas flow toward the anode channel 112 while being mixed together in the diffuser 41.

Being formed to smoothly slide along the outer surface of the bearing 26, the nozzle 11 is capable of freely shifting in the axial direction with respect to the needle 21.

In addition, the shifting action of the nozzle 11 in the axial direction changes the distance between the ejecting hole 12 of the nozzle 11 and the tip portion 24 of the needle 21, by which the area of the ejecting hole 12 is changed. That is, the area of the ejecting hole 12 increases as the distance between the ejecting hole 12 and the tip portion 24 increases due to forward movement of the nozzle 11. Conversely, the area of the ejecting hole 12 decreases as the distance between the ejecting hole 12 and the tip portion 24 decreases (i.e., as the tip portion 24 is gradually inserted into the ejecting hole 12) due to backward movement of the nozzle 11.

Here, with the increase in the area of the ejecting hole 12, the amount of hydrogen ejected from the nozzle 11 increases, by which the pressure downstream of the ejector 1 (i.e., anode pressure (gas pressure in the anode channel 112)) is increased. Conversely, with the decrease in the area of the ejecting hole 12, the anode pressure decreases due to a decrease in the amount of hydrogen ejected from the nozzle 11.

Also, the inner circumferential portion of the first diaphragm 51 is sandwiched between the nozzle 11 and a first ring member 13 attached to the nozzle 11 from outside. On the other hand, the outer circumferential portion of the first diaphragm 51 is sandwiched between the first body 31 and the diffuser 41. The first and second chambers A1 and A2 are separated from each other by the first diaphragm 51.

Further, between the first ring member 13 and the diffuser 41, the first compression coil spring 61 is held in a compressed state. The first compression coil spring 61 biases the nozzle 11 in the backward direction (leftward in FIGS. 2 and 3).

Also, the nozzle 11 is connected to a base 15 (having a hat-like cross-sectional shape) with bolts 14 penetrating the bracket 22.

In addition, a collar 16 in a cylindrical shape is placed between each bolt 14 and the bracket 22. The collar 16, which is freely slidable relative to the bracket 22, keeps the nozzle 11 and the base 15 at a prescribed distance in the axial direction. That is, the nozzle 11 is formed integrally with the bolts 14, the collars 16, the base 15, a second ring member 17 (explained later) and a third ring member 18 (explained later).

The base 15 is so provided as to house the rear end of the needle 21 and freely slide along the needle 21. The second ring member 17 and the third ring member 18 are attached to the base 15 from outside to sandwich the inner circumferential portion of the second diaphragm 52. On the other hand, the outer circumferential portion of the second diaphragm 52 is sandwiched between the first body 31 and the second body 32. The first and third chambers A1 and A3 are separated from each other by the second diaphragm 52.

The third chamber A3 (pilot chamber) is a space formed inside the second body 32. The air supplied from the cathode system flows into the third chamber A3 through an inlet port 34 of the second body 32.

In addition, to the inlet port 34, tubing 123a (pilot pressure input channel), branching off from tubing 131a (oxidizer gas supply channel) of the cathode system (explained later) so as to input the pressure inside the cathode channel 113 (cathode pressure) to the ejector 1 as the pilot pressure, is connected as shown in FIG. 1. Also, the tubing 123a is provided with an orifice 123b for regulating the amount (flow rate) of the air flowing toward the ejector 1. Further, the tubing 123a downstream of the orifice 123b is connected to an injector 123 (normally closed) via tubing 123c. The open-close control (PWM control) of the injector 123 is performed by the ECU 160. That is, the pilot pressure input to the ejector 1 drops when the injector 123 is opened by the ECU 160.

Referring again to FIGS. 2 and 3, the second compression coil spring 62 in a compressed state is held between the third ring member 18 and the second body 32. Also, the second compression coil spring 62 biases the nozzle 11 in the forward direction (rightward in FIGS. 2 and 3).

Here, the relationship among the spring force of the first and second compression coil springs 61 and 62, the pressure (pilot pressure) in the third chamber A3 (pilot chamber) and the position of the nozzle 11 will be explained.

Figure 2:
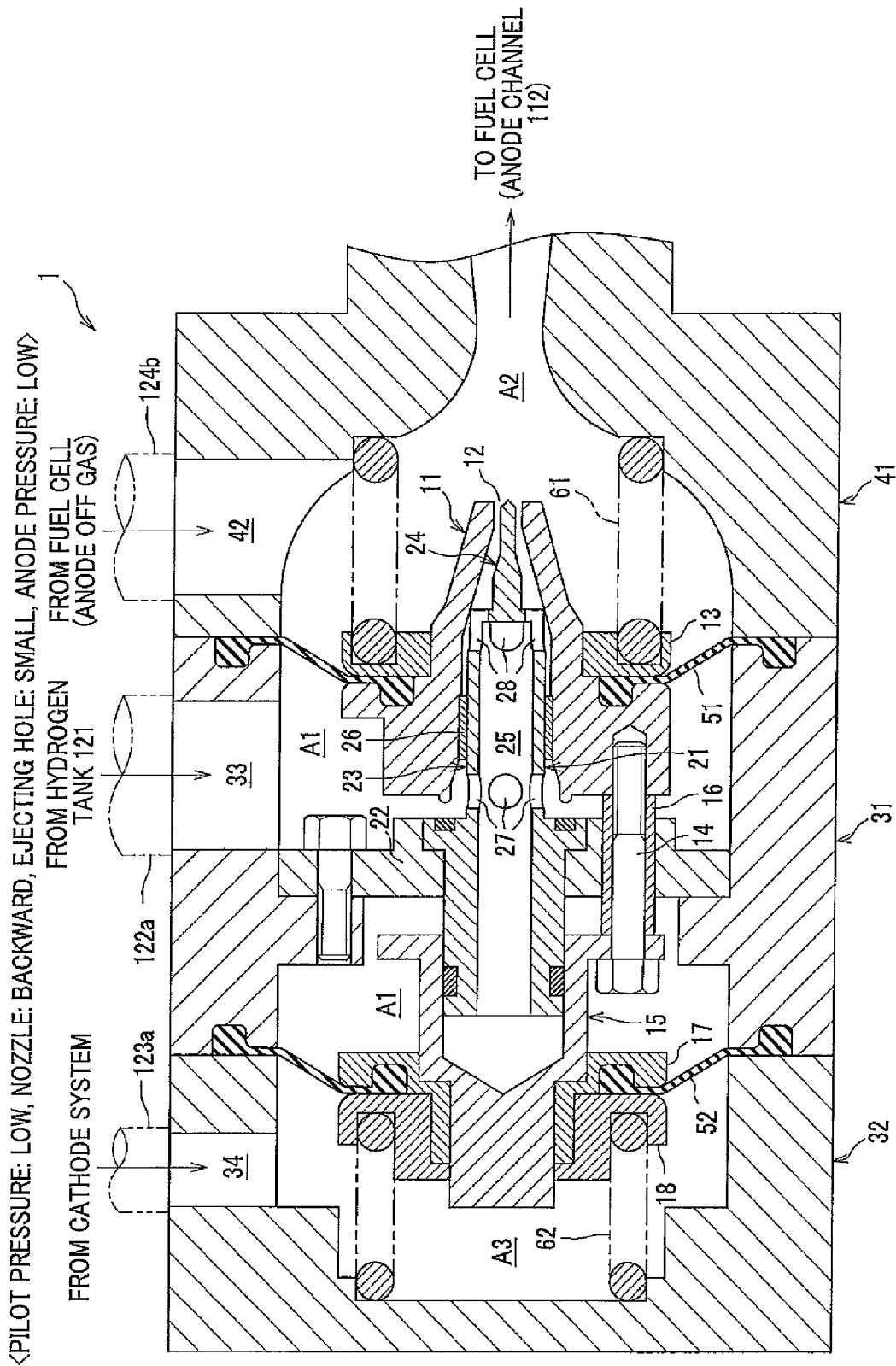
FIG. 2 is a sectional side view of an air pressure-driven ejector employed for the fuel cell system of FIG. 1 in a state in which pilot pressure is low, a nozzle is positioned backward, the nozzle's ejecting hole is small, and anode pressure (secondary-side pressure) is low.

When the system is stopped (i.e., the compressor 131 is OFF) and the pilot pressure input to the third chamber A3 (ejector 1) is low, the nozzle 11 is moved backward by the spring force of the first compression coil spring 61, by which the area of the ejecting hole 12 of the nozzle 11 is reduced (see FIG. 2).

Figure 3:
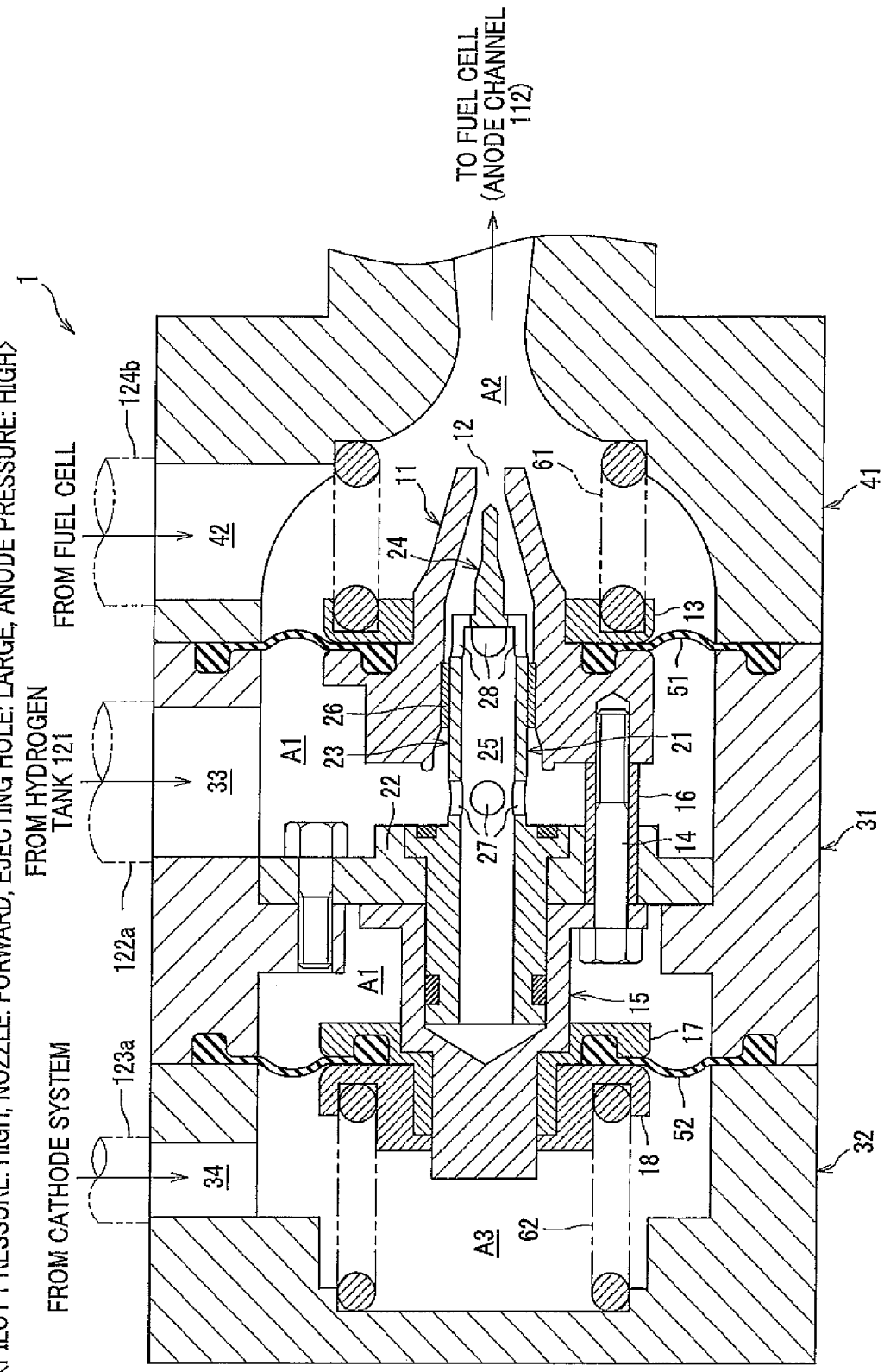
FIG. 3 is a sectional side view of the air pressure-driven ejector in a state in which the pilot pressure is high, the nozzle is positioned forward, the nozzle's ejecting hole is large, and the anode pressure (secondary-side pressure) is high.

Conversely, when the compressor 131 is ON and the pilot pressure input to the third chamber A3 is high, the air flowing into the third chamber A3 pushes the base 15 and the third ring member 18 rightward in FIG. 2, by which the nozzle 11 (which is integral with the base 15, etc) is moved forward, the area of the ejecting hole 12 is increased, and the anode pressure (the secondary-side pressure of the ejector 1) is raised (see FIG. 3).

Incidentally, the spring force of the first compression coil spring 61 and that of the second compression coil spring 62 are generally set so that the anode pressure is substantially equal to the cathode pressure (or slightly higher than the cathode pressure) since high differential pressure ($\Delta P$) between the anode pressure and the cathode pressure can cause deformation of the MEA.

Here, in the ejector 1, a pressure control mechanism (increasing the area of the ejecting hole 12 and thereby raising the secondary-side pressure when the pilot pressure input from the tubing 123a (pilot pressure input channel) rises) is provided with the needle 21 in the fixed state, the nozzle 11 shifting based on the pilot pressure, the first and second diaphragms 51 and 52 partitioning the space inside the ejector 1, and the first and second compression coil springs 61 and 62.

<Anode System—Downstream Part>

Referring again to FIG. 1, the outlet of the anode channel 112 is connected to the inlet port 42 (see FIG. 2) of the ejector 1 via tubing 124a, the gas-liquid separator 124 and tubing 124b. Also, the anode-off-gas (containing unconsumed hydrogen) discharged from the anode channel 112 (fuel off-gas) is returned to the ejector 1 via the tubing 124a, etc. and is thereafter supplied to the anode channel 112 again.

Thus, an anode-off-gas channel (hydrogen off-gas channel, fuel off-gas channel) connecting the outlet of the anode channel 112 to the inlet port 42 of the ejector 1 is provided with the tubing 124a, and the tubing 124b. The anode-off-gas channel serves as a hydrogen circulation line for circulating the hydrogen.

<Gas-liquid Separator>

The gas-liquid separator 124 separates the moisture (moisture condensation, water vapor) from the anode-off-gas and temporarily stores the separated moisture (water) in its bottom (tank part), for example.

For the gas-liquid separator 124, the following gas-liquid separating methods can be employed, for example:

(1) increasing the cross-sectional area of the anode-off-gas channel and thereby reducing the flow velocity of the anode-off-gas so that the moisture can be retained by its own weight;

(2) causing condensation of the water vapor contained in the anode-off-gas by using a refrigerant pipe through which a low-temperature refrigerant circulates; and (3) making the anode-off-gas flow meandering or gyrating and thereby exerting centrifugal force to the moisture.

<Purge Valve>

The tubing 124b is connected to a dilutor 133 (explained later) via tubing 125a, the purge valve 125, and tubing 125b.

The purge valve 125 is opened by the ECU 160 when impurities (water vapor, nitrogen, etc.) contained in the anode-off-gas discharged from the anode channel 112 and circulating through the tubing 124a and 124b have to be discharged (purged) during the electricity generation by the fuel cell stack 110 or during a period in which the electricity generation is stopped.

Incidentally, the ECU 160 is configured to judge that the impurities have to be discharged and open the purge valve 125 when the voltage of any one of the single cells forming the fuel cell stack 110 (cell voltage) has fallen below a preset cell voltage, for example.

Also, the purge valve 125 is configured to be opened together with the scavenging gas discharge valve 126 and the drain valve 127 at the time of the scavenging of the anode channel 112 in order to quickly discharge the scavenging gas and the moisture (which have been discharged and pushed out from the anode channel 112 to the tubing 124a and 124b) to the dilutor 133 (outside).

<Scavenging Gas Discharge Valve>

Also, the tubing 124b upstream of the part connecting to the tubing 125a (purge valve 125) is connected to the dilutor 133 (explained later) via tubing 126a, the scavenging gas discharge valve 126, and tubing 126b.

The scavenging gas discharge valve 126 is configured to be opened together with the purge valve 125, etc. at the time of the scavenging of the anode channel 112 in order to quickly discharge the scavenging gas and the moisture (which have been discharged and pushed out from the anode channel 112) to the dilutor 133 (outside).

<Drain Valve>

The bottom of the gas-liquid separator 124 is connected to the dilutor 133 (explained later) via tubing 127a, the drain valve 127, and tubing 127b. The drain valve 127 is opened by the ECU 160 when the moisture (water) stored in the bottom of the gas-liquid separator 124 (i.e., the moisture discharged from the anode channel 112 to the anode-off-gas channel (tubing 124a, etc.)) has to be discharged to the dilutor 133.

In addition, the amount of the water stored in the gas-liquid separator 124 is detected by a water level sensor or calculated based on the integral of the output current of the fuel cell stack 110.

Also, the drain valve 127 is opened together with the scavenging gas discharge valve 126, etc. at the time of the scavenging of the anode channel 112 in order to quickly discharge the scavenging gas and the moisture (which have been discharged and pushed out from the anode channel 112 to the tubing 124a and 124b) to the dilutor 133 (outside).

The pressure sensor 128 is attached to the tubing 122b. The pressure sensor 128 outputs its reading to the ECU 160 as the current value of the pressure inside the anode channel 112 (anode pressure P11).

The position of the pressure sensor 128 is not restricted to that in this example; the pressure sensor 128 may also be attached to the anode channel 112 or the tubing 124a, for example.

The temperature sensor 129 is attached to the tubing 124a. The temperature sensor 129 detects the temperature inside the tubing 124a as system temperature T11 and outputs the reading (system temperature T11) to the ECU 160.

The position of the temperature sensor 129 for detecting the system temperature is not restricted to that in this example; the temperature sensor 129 may also be attached to tubing 132a shown in FIG. 1 or tubing (not shown) for circulating coolant discharged from the fuel cell stack 110, for example.

<Cathode System>

The cathode system includes the compressor 131 (oxidizer gas supply unit, scavenging gas supply unit), a back pressure valve 132 (normally open), and the dilutor 133.

The compressor 131 is connected to the inlet of the cathode channel 113 via the tubing 131a (oxidizer gas (air) supply channel). According to instructions from the ECU 160, the compressor 131 takes in air containing oxygen and supplies the air to the cathode channel 113 via the tubing 131a. Also, at the time of the scavenging of the fuel cell stack 110, the compressor 131 functions as the scavenging gas supply unit for supplying the scavenging gas to the fuel cell stack 110.

In addition, the cathode system includes a humidifier (not shown) placed to straddle the tubing 131a and the tubing 132a. The humidifier (containing multiple hollow-fiber membranes permeable by moisture) humidifies the air flowing toward the cathode channel 113 by causing the air (flowing toward the cathode channel 113) and highly humid cathode-off-gas (discharged from the cathode channel 113) to exchange moisture via the hollow-fiber membranes.

The outlet of the cathode channel 113 is connected to the dilutor 133 via the tubing 132a, the back pressure valve 132, and tubing 132b. Also, the cathode-off-gas discharged from the cathode channel 113 (cathode) is lead to the dilutor 133 through the tubing 132a, etc.

The back pressure valve 132 (e.g., butterfly valve) regulates the pressure of the air in the cathode channel 113 by changing its opening degree according to control by the ECU 160.

Here, the gas pressure in the cathode channel 113 (cathode pressure) is controlled by the revolving speed (discharge pressure) of the compressor 131 and/or the opening degree of the back pressure valve 132. That is, the cathode pressure rises when the revolving speed (discharge pressure) of the compressor 131 increases. Also, the cathode pressure rises when the opening degree of the back pressure valve 132 decreases. Thus, a pressure control unit for controlling the pressure of the air in the cathode channel 113 (cathode pressure) is provided with the compressor 131, and the back pressure valve 132.

In addition, by the control of the cathode pressure, the pilot pressure input to the ejector 1 via the tubing 123a is also controlled in conjunction with the cathode pressure. That is, the pilot pressure increases with the increase in the cathode pressure and decrease with the decrease in the cathode pressure.

Also, the flow rate of the air flowing through the cathode channel 113 is controlled by the revolving speed (discharge flow rate) of the compressor 131 and/or the opening degree of the back pressure valve 132. That is, the air flow rate rises when the revolving speed of the compressor 131 increases. Also, the air flow rate rises when the opening degree of the back pressure valve 132 increases. Thus, a flow rate control unit for controlling the flow rate of the air flowing through the cathode channel 113 is provided with the compressor 131, and the back pressure valve 132.

The dilutor 133, as a container for mixing the anode-off-gas from the purge valve 125 with the cathode-off-gas (diluting gas) from the tubing 132b and thereby diluting hydrogen in the anode-off-gas with the cathode-off-gas, has a diluting space inside. After the dilution, the gas is discharged to the outside of the vehicle via tubing 133a.

<Scavenging Gas Introducing System>

The scavenging gas introducing system includes a scavenging gas introducing valve 141 (normally closed). The upstream end (inlet) of the scavenging gas introducing valve 141 is connected to the tubing 131a via tubing 141a. The downstream end (outlet) of the scavenging gas introducing valve 141 is connected to the tubing 122b via tubing 141b.

Also, at the time of the scavenging of the fuel cell stack 110 (anode channel 112), the scavenging gas introducing valve 141 is opened by the ECU 160 while the compressor 131 is working, by which the scavenging gas from the compressor 131 is introduced into the anode channel 112.

<Other Components>

A temperature sensor 151 for detecting outside air temperature T12 (ambient temperature of the fuel cell system 100) is placed at an appropriate position in the fuel cell electric vehicle. The temperature sensor 151 outputs the detected outside air temperature T12 to the ECU 160.

An accelerator 152, as a pedal to be depressed by the driver for driving the fuel cell electric vehicle, is placed at the driver's feet. The accelerator 152 outputs its angle (the degree of depressing the pedal) to the ECU 160.

<ECU>

The ECU 160, as a controller for electronically controlling the fuel cell system 100, includes a Central Processing Unit (CPU), a Read Only Memory (ROM), a Random Access Memory (RAM), various interfaces, and electronic circuits, etc. The ECU 160 executes a variety of functions and controls various devices according to programs stored therein.

<ECU—Valve Control Function>

The ECU 160 (valve control unit) has the function of controlling the open-close operation of the shut-off valve 122, the purge valve 125, the scavenging gas discharge valve 126, the drain valve 127, and the scavenging gas introducing valve 141.

<ECU—Malfunction Judgment Function>

The ECU 160 also has the function of judging whether the electricity generation status of the fuel cell stack 110 is currently in a poor condition (malfunction) or not based on the average cell voltage and/or the lowest cell voltage input from the cell voltage monitor 115.

Specifically, the ECU 160 is configured to judge that the electricity generation status of the fuel cell stack 110 is currently poor when (1) the average cell voltage is equal to or less than a preset average cell voltage, or (2) the lowest cell voltage is equal to or less than a preset lowest cell voltage. The preset average cell voltage and the preset lowest cell voltage (voltage values which have been obtained by pretests, etc.) are threshold voltages indicative that a large amount of moisture remains in the anode channel 112 and the cathode channel 113, moisture condensation has adhered to the MEAs of the fuel cell stack 110, and the electricity generation status of the fuel cell stack 110 is in a poor condition.

In addition, in the case where the electricity generation status of the fuel cell stack 110 is judged to be poor, the ECU 160 restores the electricity generation status to a good condition by raising the anode pressure P11 to any one of target anode pressures P1, P2, and P3 and thereafter opening the purge valve 125 (discharging the moisture) as will be explained later.

<ECU—Low Temperature Judgment Function>

The ECU 160 also has the function of judging whether the current temperature is low (i.e., the probability of subsequent condensation of the water vapor remaining in the anode channel 112 and the cathode channel 113 is high) or not based on the system temperature T11 input from the temperature sensor 129 and/or the outside air temperature T12 input from the temperature sensor 151.

Specifically, the ECU 160 is configured to judge that the current temperature is low when (1) the system temperature T11 is equal to or less than a preset system temperature T1, or (2) the outside air temperature T12 is equal to or less than a preset outside air temperature.

In addition, the preset system temperature T1 and the preset outside air temperature (temperature values obtained by pretests, etc.) are set at values indicative of low temperature and subsequent condensation of the water vapor remaining in the anode channel 112, etc. (e.g., 0-5° C.). Also, in an explanation of the operation of the fuel cell system 100 (described later), the temperature judgment is made based on the system temperature T11.

The temperature judgment may be made differently. For example, the temperature is be judged to be low when the system temperature T11 at startup of the system (at the start of the electricity generation) is equal to or less than the preset system temperature T1 even if the current system temperature T11 is not equal to or lower than the preset system temperature T1 (ditto for the outside air temperature T12).

<ECU—Electricity Generation Duration Judgment Function>

The ECU 160 (electricity generation duration judgment unit) also has the function of calculating "latest electricity generation duration $\Delta t21$" of the fuel cell stack 110 by using a built-in clock. The "latest electricity generation duration $\Delta t21$" means the duration of the latest electricity generation, that is, the length of the time from the start of the latest electricity generation to the end of the latest electricity generation.

In this example, the fuel cell stack 110 is judged to be during electricity generation when control for drawing electric current from the fuel cell stack 110 is under way according to instructions from the ECU 160. Incidentally, the output terminal of the fuel cell stack 110 is connected to an electric power controller (including a DC-DC chopper circuit, etc.). The electric power controller operates according to a current instruction value and a voltage instruction value input from the ECU 160, by which the electric power (including "0") generated by the fuel cell stack 110 is controlled.

Also, the ECU 160 has the function of judging whether the latest electricity generation by the fuel cell stack 110 is a short-time electricity generation or not (i.e., whether the electricity generation duration $\Delta t21$ is short or not) based on the calculated value of the electricity generation duration $\Delta t21$ when the temperature is judged to be low as above.

Specifically, the ECU 160 is configured to judge that the latest electricity generation by the fuel cell stack 110 is the short-time electricity generation if the electricity generation duration $\Delta t21$ is equal to or less than a preset electricity generation duration $\Delta t0$.

In addition, the preset electricity generation duration $\Delta t0$ (duration (time length) obtained by pretests, etc.) is set at a value indicative that the total amounts of hydrogen that has flowed through the anode channel 112 and air that has flowed through the cathode channel 113 during the electricity generation are too small (as a result of short-time electricity generation) and the moisture caused by the electricity generation remains intact in the anode channel 112 and the cathode channel 113 (e.g., 5-30 minutes).

<ECU—Pressure Setting Function>

The ECU 160 (pressure setting unit) has the function of calculating an electricity generation demand level regarding the fuel cell stack 110 (i.e., the amount of electricity generation demanded by loads such as the motor of the vehicle) based on the accelerator angle input from the accelerator 152. In addition, the electricity generation demand level increases with the increase in the accelerator angle.

Figure 4:
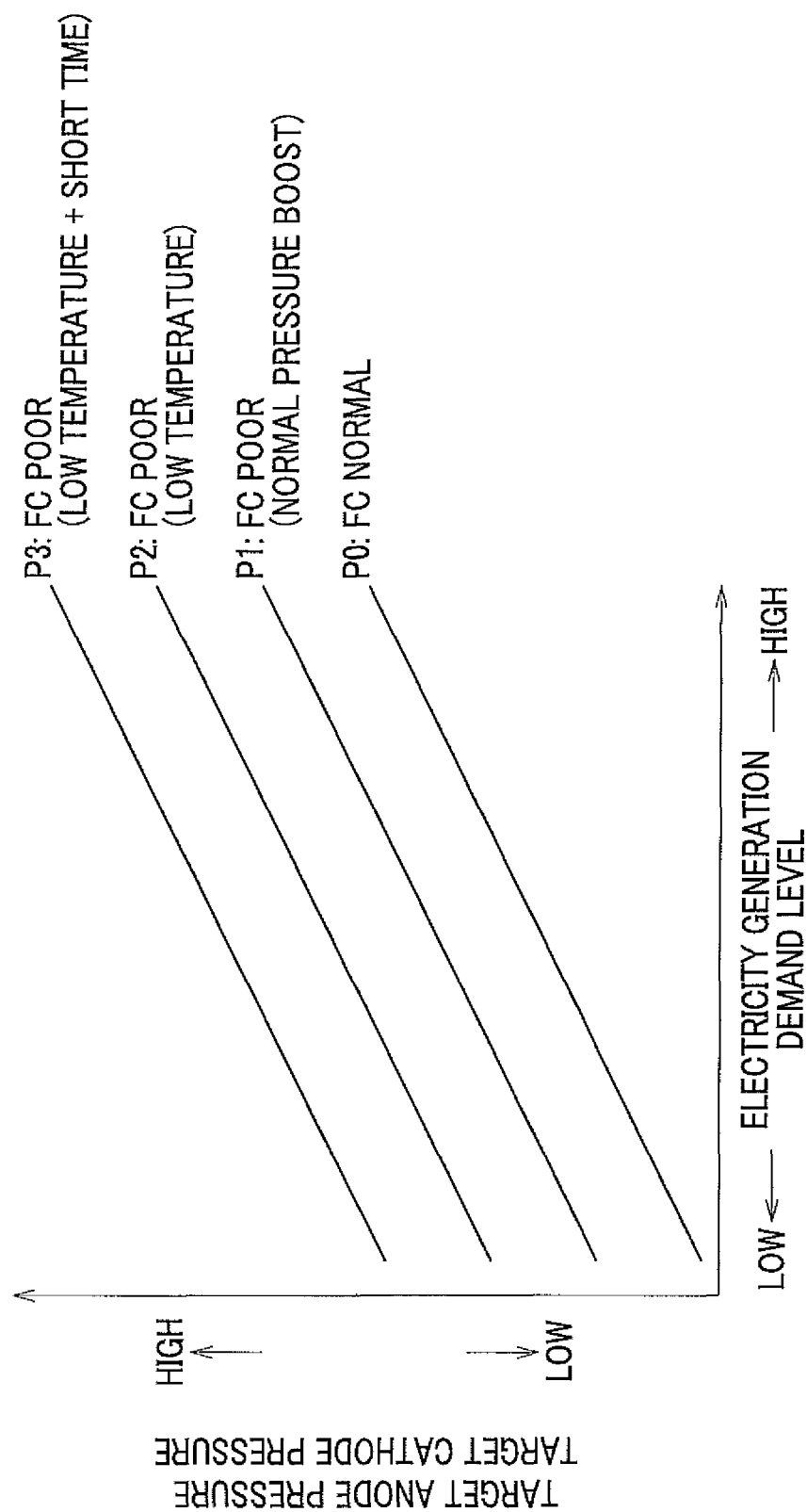
FIG. 4 is a map indicating relationship between an electricity generation demand level and target anode pressure (target cathode pressure)

Also, the ECU 160 has the function of calculating target anode pressures (P0-P3) and target cathode pressures (P0-P3) based on the calculated electricity generation demand level and the map in FIG. 4.

While the target anode pressures (P0-P3) are set equal to the target cathode pressures (P0-P3), respectively, in this example (in consideration of the pressure balance between both sides of the MEA), it is also possible to set the target anode pressures (P0-P3) which is higher or lower than the target cathode pressures (P0-P3), respectively.

As shown in FIG. 4, the target anode pressures P0-P3 (target cathode pressures P0-P3) are set to increase with the increase in the electricity generation demand level and to increase in the following order P0<P1<P2<P3.

The target anode pressure P0 (target cathode pressure P0) is a normal pressure to be used as the target when the electricity generation status of the fuel cell stack 110 is normal (not poor).

The target anode pressure P1 (target cathode pressure P1) is a first pressure to be used as the target when the electricity generation status of the fuel cell stack 110 is judged to be poor.

The target anode pressure P2 (target cathode pressure P2) is a second pressure to be used as the target when the electricity generation status of the fuel cell stack 110 is judged to be poor and the temperature (e.g., system temperature T11) is judged to be low.

The target anode pressure P3 (target cathode pressure P3) is a third pressure to be used as the target when the electricity generation status of the fuel cell stack 110 is judged to be poor, the temperature (e.g., system temperature T11) is judged to be low, and the latest electricity generation by the fuel cell stack 110 is judged to have been short-time electricity generation.

The target anode pressures P1-P3 and the target cathode pressures P1-P3 (to be used when the electricity generation status is poor) are pressure values obtained by pretests, etc. The target anode pressures P1-P3 and the target cathode pressures P1-P3 are set at appropriate pressure levels at which the moisture which remains in the fuel cell stack 110 (whose electricity generation status is judged to be poor) can be discharged excellently through the subsequently opened purge valve 125.

<ECU—Back Pressure Valve/Compressor Control Function>

Figure 5:
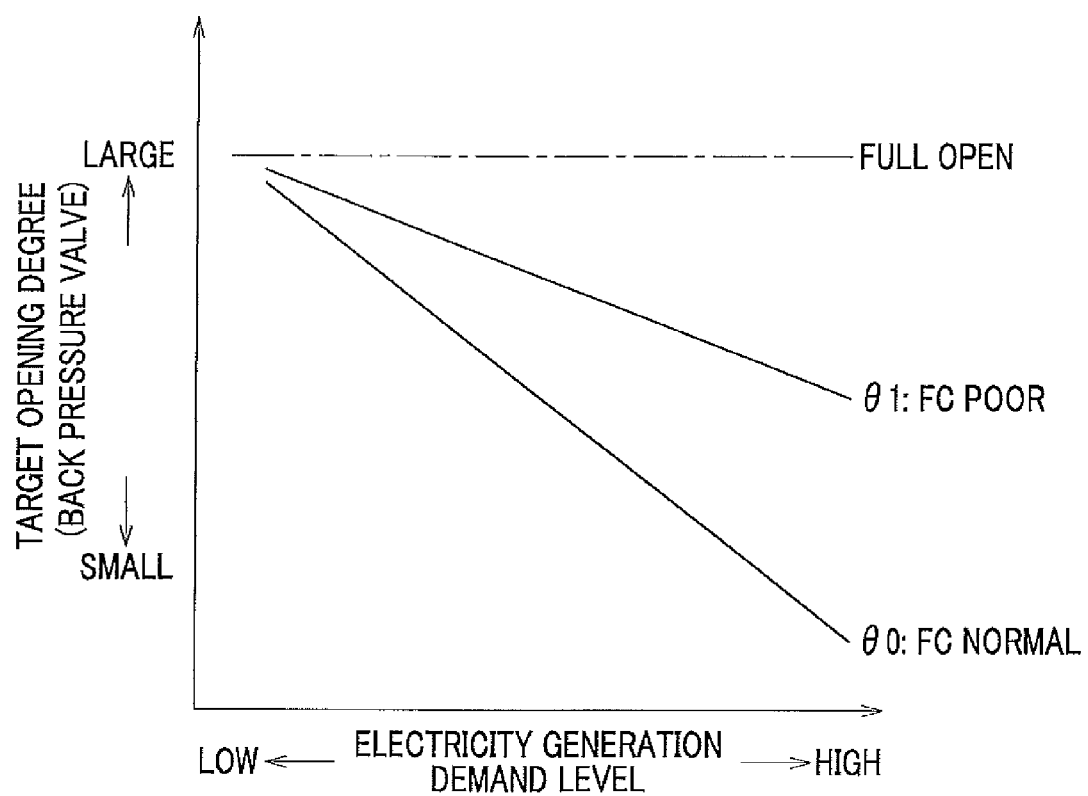
FIG. 5 is a map indicating relationship between the electricity generation demand level and a target opening degree of a back pressure valve.
Figure 6:
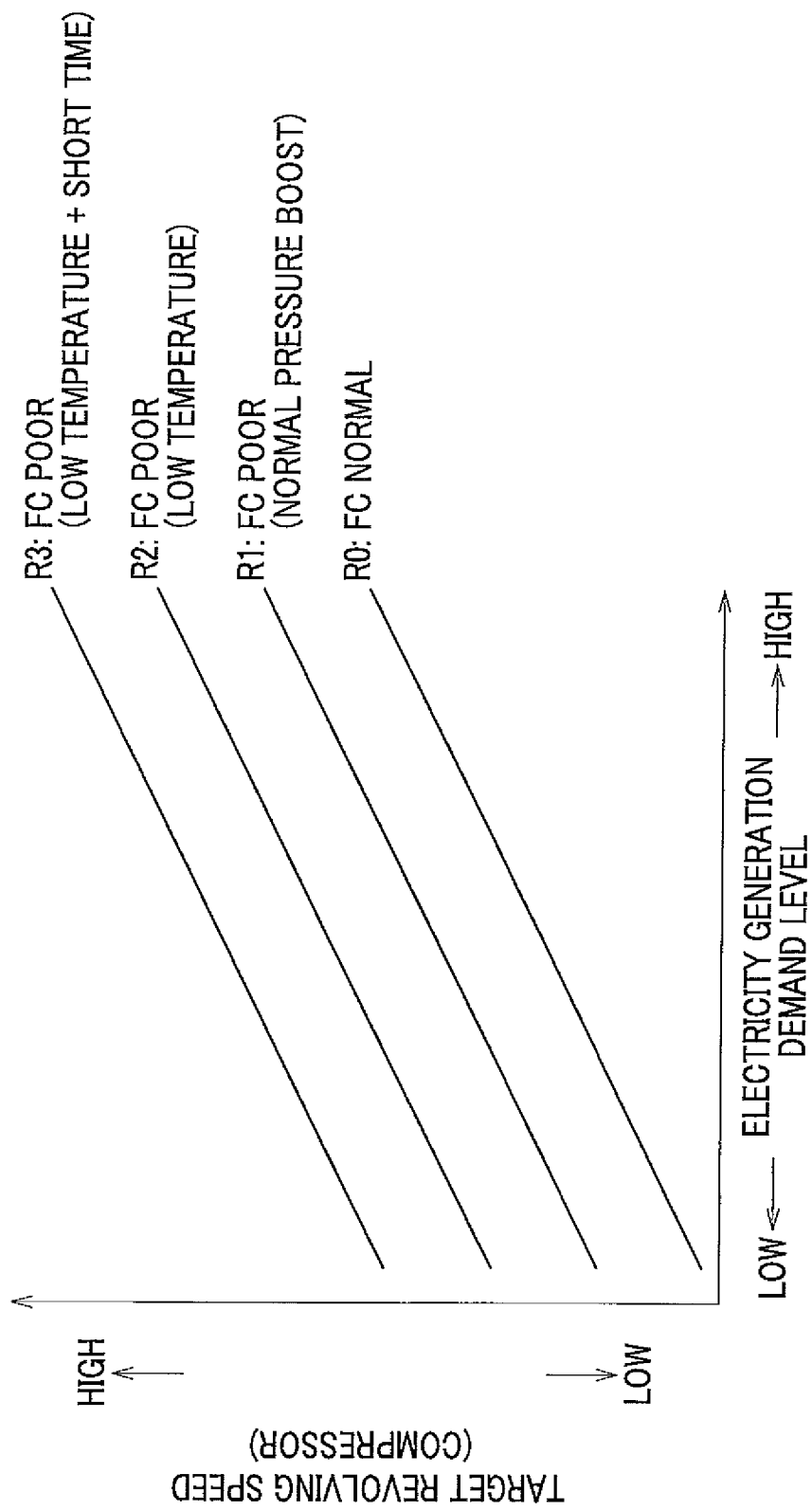
FIG. 6 is a map indicating relationship between the electricity generation demand level and a target revolving speed of a compressor.

The ECU 160 has the function of calculating a target opening degree ($\theta 0, \theta 1$) of the back pressure valve 132 and a target revolving speed (R0-R3) of the compressor 131 (suitable for setting the current anode pressure P11 and the current cathode pressure at the target anode pressure (P0-P3) and the target cathode pressure (P0-P3), respectively) based on the electricity generation demand level and the maps in FIGS. 5 and 6 and then controlling the back pressure valve 132 and the compressor 131 according to the calculated target opening degree (80, 81) and target revolving speed (R0-R3).

The target opening degree 80 of the back pressure valve 132 is an opening degree to be used as the target when the electricity generation status of the fuel cell stack 110 is judged to be normal, while the target opening degree 81 is an opening degree to be used as the target when the electricity generation status is judged to be poor.

Also, as shown in FIG. 5, each target opening degree (θ0, θ1) of the back pressure valve 132 is set so as to decrease (in order to raise the cathode pressure) with the increase in the electricity generation demand level. The target opening degree θ1 (to be referred to when the electricity generation status of the fuel cell stack 110 is judged to be poor) is set to be greater than the target opening degree θ0 (to be referred to when the electricity generation status is judged to be normal) in order to raise the flow rate of the air flowing through the cathode channel 113.

Incidentally, the target opening degree 81 may be set at a full opening degree (maximum opening degree). Also, similar to the target revolving speed (R1-R3) of the compressor 131, the target opening degree 81 may be set more precisely for cases where (1) the electricity generation status is poor, (2) the electricity generation status is poor and the temperature is low, and (3) the electricity generation status is poor, the temperature is low, and the latest electricity generation is short-time electricity generation so that the target opening degree 81 gradually increases in the above order.

The target revolving speed R0 of the compressor 131 is a revolving speed to be used as the target when the electricity generation status of the fuel cell stack 110 is judged to be normal. The target revolving speed R1 is a revolving speed to be used as the target when the electricity generation status is judged to be poor. The target revolving speed R2 is a revolving speed to be used as the target when the electricity generation status is judged to be poor and the temperature (e.g., system temperature T11) is judged to be low. The target revolving speed R3 is a revolving speed to be used as the target when the electricity generation status is judged to be poor, the temperature (e.g., system temperature T11) is judged to be low, and the latest electricity generation is judged to have been short-time electricity generation.

Also, as shown in FIG. 6, each target revolving speed (R0-R3) of the compressor 131 is set so as to increase (in order to raise the cathode pressure, the anode pressure, and the flow rate of the air flowing through the cathode channel 113) with the increase in the electricity generation demand level. In addition, with the increase in the cathode pressure, the pilot pressure input to the ejector 1 rises and the anode pressure (secondary-side pressure of the ejector 1) also rises as mentioned above.

The target revolving speeds R0-R3 are set to increase in the following order R0<R1<R2<R3.

In addition, the target opening degrees θ0 and θ1 of the back pressure valve 132 and the target revolving speeds R0-R3 of the compressor 131 explained above (previously determined by pretests, etc. so as to achieve the target anode pressures P0-P3 and the target cathode pressures P0-P3) have been prestored in the ECU 160. Also, the target opening degree θ1 and the target revolving speeds R1-R3 are set so that the anode pressure P11 reaches each of the target anode pressures P0-P3 and the cathode pressure reaches each of the target cathode pressures P0-P3 after the same time period (Δt1, Δt2, Δt3) elapses from the start of the pressure boosting (see FIG. 8).

<<Operation of Fuel Cell System>>

Figure 7:
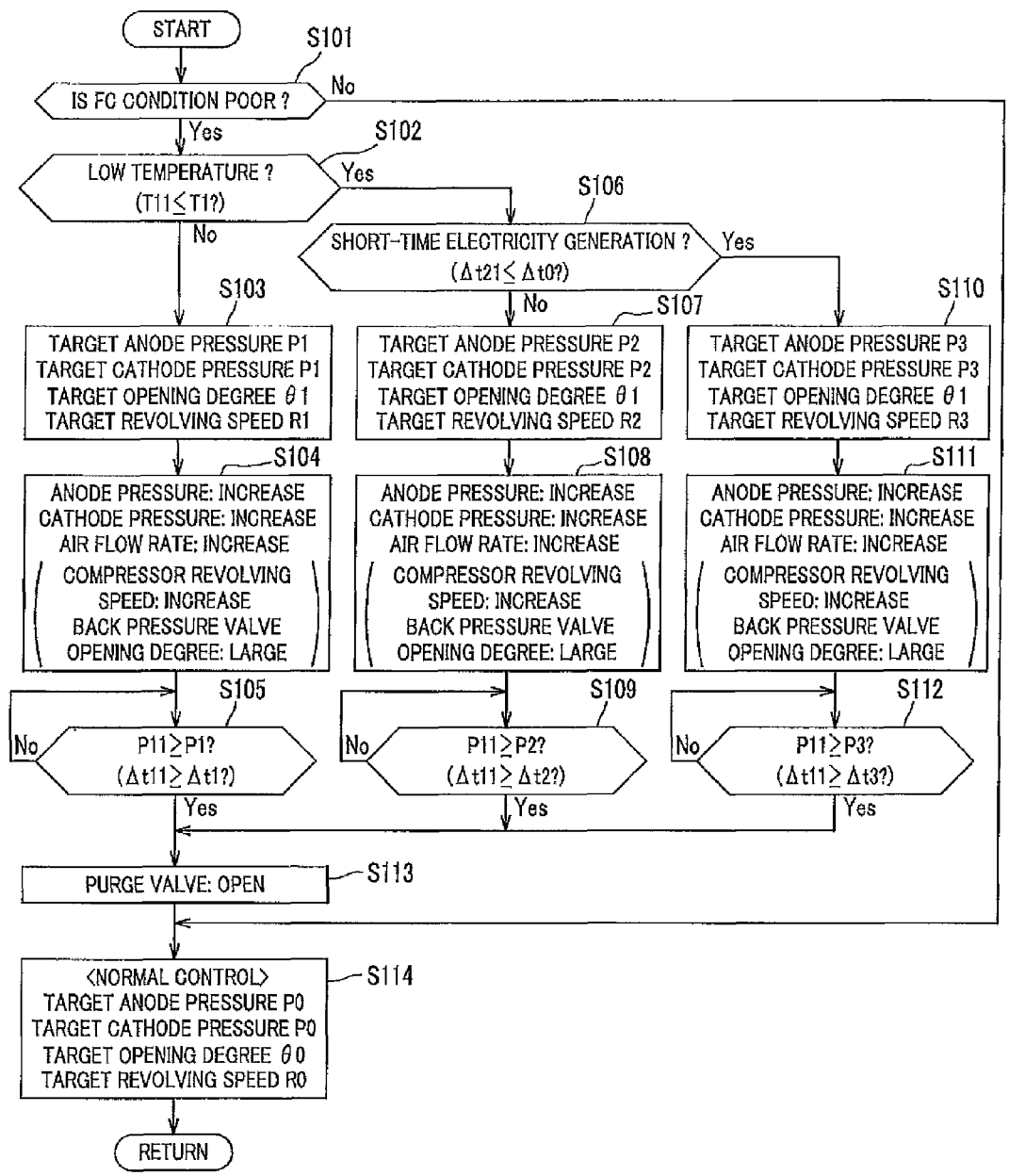
FIG. 7 is a flow chart showing the operation of the fuel cell system according to the embodiment.

Next, the operation of the fuel cell system 100 will be explained with reference to FIG. 7.

In an initial state in which the electricity generation status of the fuel cell stack 110 is normal, the ECU 160 calculates the target anode pressure P0, the target cathode pressure P0, the target revolving speed R0 of the compressor 131, and the target opening degree θ0 of the back pressure valve 132 based on the accelerator angle (electricity generation demand level) and controls the compressor 131 and the back pressure valve 132 according to the calculated target revolving speed R0 and target opening degree θ0.

In step S101, the ECU 160 judges whether the electricity generation status of the fuel cell stack 110 is poor or not based on the average cell voltage and/or the lowest cell voltage input from the cell voltage monitor 115.

If the electricity generation status of the fuel cell stack 110 is judged to be poor (S101: YES), the process proceeds to step S102. On the other hand, if the electricity generation status of the fuel cell stack 110 is judged not to be poor (S101: NO), the process proceeds to step S114.

In the step S102, the ECU 160 judges whether the temperature is low or not based on the system temperature T11 input from the temperature sensor 129 and the preset system temperature T1.

If the temperature is judged to be low, that is, if the system temperature T11 is equal to or less than the preset system temperature T1 (S102: YES), the process proceeds to step S106. If the temperature is judged not to be low (S102: NO), the process proceeds to step S103.

In the step S103, the ECU 160 calculates the target anode pressure P1, the target cathode pressure P1, the target opening degree θ1 of the back pressure valve 132, and the target revolving speed R1 of the compressor 131 based on the accelerator angle (electricity generation demand level) and the maps in FIGS. 4-6.

In step S104, the ECU 160 controls the back pressure valve 132 and the compressor 131 according to the target opening degree θ1 and the target revolving speed R1 calculated in the step S103, that is, increases the revolving speed of the compressor 131 and the opening degree of the back pressure valve 132 compared to the control for the normal electricity generation status.

Accordingly, the cathode pressure increases and the flow rate of the air flowing through the cathode channel 113 rises, by which the moisture, etc. adhering to the cathode channel 113 and the cathode-side surface of each MEA are quickly discharged from the cathode channel 113. Consequently, the electrode reaction at each cathode progresses finely and the electricity generation status of the fuel cell stack 110 heads toward recovery.

Also, with the increase in the cathode pressure, the pilot pressure input to the ejector 1 increases. With the increase in the pilot pressure, the nozzle 11 moves forward, the area of the nozzle's ejecting hole 12 increases (see FIG. 3), the flow rate of the hydrogen ejected from the nozzle 11 increases, and the anode pressure P11 starts rising toward the target anode pressure P1.

In this case where the anode pressure P11 is raised, it is desirable that the injector 123 be kept closed (ditto for steps S108 and S111 which will be explained later).

In step S105, the ECU 160 judges whether or not the current anode pressure P11 input from the pressure sensor 128 is equal to or greater than the target anode pressure P1 (already calculated and set in S103).

If the current anode pressure P11 is equal to or greater than the target anode pressure P1 (S105: YES), the process proceeds to step S113. On the other hand, if the current anode pressure P11 is less than the target anode pressure P1 (S105: NO), the ECU 160 repeats the judgment in the step S105.

Next, step S106 to which the step S102 proceeds if the result of the judgment in the steps 102 is "YES" will be explained.

In the step S106, the ECU 160 judges whether the latest electricity generation by the fuel cell stack 110 is short-time electricity generation or not. In addition, as described above, the ECU 160 judges that the latest electricity generation is short-time electricity generation if the latest electricity generation duration $\Delta t21$ is equal to or less than the preset electricity generation duration $\Delta t0$.

If the latest electricity generation by the fuel cell stack 110 is judged to be the short-time electricity generation (S106: YES), the process proceeds to step S110. On the other hand, if the latest electricity generation by the fuel cell stack 110 is judged not to be the short-time electricity generation (S106: NO), the process proceeds to step S107.

In the step S107, the ECU 160 calculates the target anode pressure P2, the target cathode pressure P2, the target opening degree θ1 of the back pressure valve 132, and the target revolving speed R2 of the compressor 131 based on the accelerator angle (electricity generation demand level) and the maps in FIGS. 4-6.

In the step S108, the ECU 160 controls the back pressure valve 132 and the compressor 131 according to the target opening degree θ1 and the target revolving speed R2 calculated in the step S107.

Accordingly, the cathode pressure increases and the flow rate of the air flowing through the cathode channel 113 rises, by which the moisture, etc. in the cathode channel 113 are quickly discharged from the cathode channel 113, and the electricity generation status of the fuel cell stack 110 heads toward recovery.

In this case, the cathode pressure and the air flow rate become higher than those in the step S104, by which the moisture building up in the cathode channel 113 is discharged more reliably compared to the step S104.

Also, with the increase in the cathode pressure, the pilot pressure input to the ejector 1 increases. With the increase in the pilot pressure, the nozzle 11 moves forward, the area of the nozzle's ejecting hole 12 increases (see FIG. 3), and the anode pressure P11 starts rising toward the target anode pressure P2.

In step S109, the ECU 160 judges whether or not the current anode pressure P11 is equal to or greater than the target anode pressure P2 (which was calculated and set in S107).

If the current anode pressure P11 is equal to or greater than the target anode pressure P2 (S109: YES), the process proceeds to the step S113. On the other hand, if the current anode pressure P11 is less than the target anode pressure P2 (S109: NO), the ECU 160 repeats the judgment in the step S109.

Next, step S110 to which the step S106 proceeds if the result of the judgment in the steps 106 is "YES" will be explained.

In the step S110, the ECU 160 calculates the target anode pressure P3, the target cathode pressure P3, the target opening degree θ1 of the back pressure valve 132, and the target revolving speed R3 of the compressor 131 based on the accelerator angle (electricity generation demand level) and the maps in FIGS. 4-6.

In step S111, the ECU 160 controls the back pressure valve 132 and the compressor 131 according to the target opening degree θ1 and the target revolving speed R3 calculated in the step S110.

Accordingly, the cathode pressure increases and the flow rate of the air flowing through the cathode channel 113 rises, by which the moisture, etc. in the cathode channel 113 are quickly discharged from the cathode channel 113 and the electricity generation status of the fuel cell stack 110 heads toward recovery.

In this case, the cathode pressure and the air flow rate become higher than those in the step S108, by which the moisture remaining in the cathode channel 113 is discharged more reliably compared to the step S108.

Also, with the increase in the cathode pressure, the pilot pressure input to the ejector 1 increases. With the increase in the pilot pressure, the nozzle 11 moves forward, the area of the nozzle's ejecting hole 12 increases (see FIG. 3), and the anode pressure P11 starts rising toward the target anode pressure P3.

In step S112, the ECU 160 judges whether or not the current anode pressure P11 is equal to or greater than the target anode pressure P3.

If the current anode pressure P11 is equal to or greater than the target anode pressure P3 (S112: YES), the process proceeds to the step S113. On the other hand, if the current anode pressure P11 is less than the target anode pressure P3 (S112: NO), the ECU 160 repeats the judgment in the step S112.

In step S113, the ECU 160 opens the purge valve 125 for a prescribed time period (valve opening time period), by which the moisture (water vapor, moisture condensation) remaining in the anode channel 112, the gas-liquid separator 124, the tubing 124*a*, the tubing 124*b*, etc. is discharged to the dilutor 133 (outside) through the opened purge valve 125 and the electricity generation status of the fuel cell stack 110 recovers from the poor condition.

In this case, with the increase in the expected value of the amount of moisture remaining in the anode channel 112, etc. (i.e., with the condition worsening to (1) poor electricity generation status, (2) poor electricity generation status and low temperature, and (3) poor electricity generation status, low temperature, and short-time electricity generation), the target value of the anode pressure P11 is increased stepwise to the target anode pressures P1, P2 and P3 (P1<P2<P3), by which the moisture remaining in the anode channel 112, etc. can be discharged with high reliability.

Figure 8:
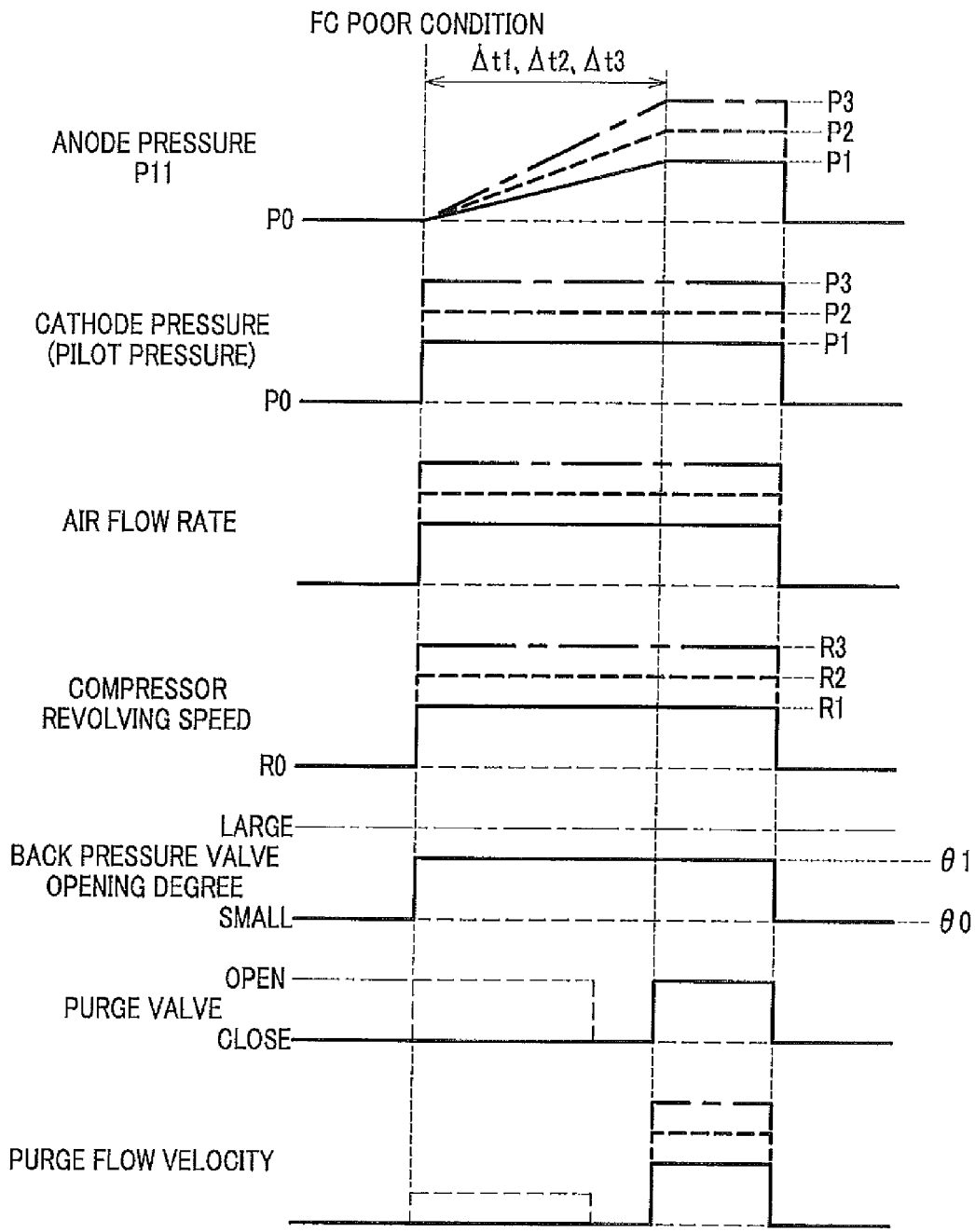
FIG. 8 is a timing chart showing an example of the operation of the fuel cell system according to the embodiment.

Incidentally, since the purge flow rate (purge flow per unit time (L/s)) and the purge flow velocity (with the purge valve 125 open) increase with the increase in the anode pressure P11 (see FIG. 8), the opening time period of the purge valve 125 may be shortened (see EXAMPLE #1-EXAMPLE #3 in FIG. 8) compared to the case where the anode pressure is not raised (see COMPARATIVE EXAMPLE #1 in FIG. 8).

In step S114, the ECU 160 calculates the target anode pressure P0, the target cathode pressure P0, the target opening degree θ0 of the back pressure valve 132, and the target revolving speed R0 of the compressor 131 based on the accelerator angle (electricity generation demand level) and the maps in FIGS. 4-6 and controls the compressor 131 and the back pressure valve 132 accordingly (normal control), by which the cathode pressure, the anode pressure, and the air flow rate are kept at normal levels.

Thereafter, the process of ECU 160 returns to "START" via "RETURN".

<<Effect of Fuel Cell System>>

Effects achieved by the fuel cell system 100 described above will be explained below referring to FIG. 8. In the examples shown in FIG. 8, the accelerator angle (electricity generation demand level) is assumed to be constant for simplicity of explanation.

When the electricity generation status of the fuel cell stack 110 is poor and the purging has to be carried out for recovery by opening the purge valve 125 (S101: YES), the ECU 160 judges whether the temperature is low or not (S102), judges whether the latest electricity generation by the fuel cell stack 110 is short-time electricity generation or not (S106), and sets the target anode pressure P1-P3. After the current anode pressure P11 has reached the target anode pressure (P1-P3) (S105: YES, S109: YES, S112: YES), the purge valve 125 is opened (S113), by which the moisture remaining in the anode channel 112, the gas-liquid separator 124, and the tubing 124a, etc. is discharged appropriately and the electricity generation status of the fuel cell stack 110 quickly recovers from the poor condition.

Since the anode pressure P11 has already been raised to the target anode pressure (P1-P3), high purge flow velocity with the purge valve 125 open can be achieved. Therefore, the opening time period of the purge valve 125 can be shortened (see EXAMPLES #1-#3) compared to the COMPARATIVE EXAMPLE #1 not raising the anode pressure.

Further, moisture remaining in the cathode channel 113 can also be discharged quickly since the flow rate of the air flowing through the cathode channel 113 is also raised when the anode pressure P11 is raised. Further, since the air flow rate (i.e., discharge flow rate of the compressor 131) is also increased when the cathode pressure is raised in order to raise the anode pressure, it is possible to quickly raise the cathode pressure while maintaining the power of the compressor 131. Raising the discharge pressure while also raising the discharge flow rate is an easier and better way to maintain the power of the compressor 131 since electric power consumption of the compressor 131 barely increases even with the increase in the revolving speed.

Furthermore, the fuel cell system 100 of this embodiment, equipped not with an electromagnetic driving unit (e.g., solenoid) but with an air pressure-driven ejector 1 for controlling the anode pressure P11, can be implemented in a simple configuration. Also, since the mechanical ejector 1 consumes no electric power for the control of the anode pressure P11, the fuel cell system 100 of this embodiment is advantageous for increasing the travel distance of the fuel cell electric vehicle.

While a preferred embodiment of the present invention has been described, the present invention is not limited thereto and various changes and modifications can be made herein without departing from the scope of the invention as defined by the appended claims.

For example, while the purge valve 125 is opened (S113) after the current anode pressure P11 detected by the pressure sensor 128 has reached the target anode pressure (P1-P3) (S105: YES, S109: YES, S112: YES) in the above embodiment, it is also possible to open the purge valve 125 (S113) when elapsed time period $\Delta t11$ since the start of the boosting of the cathode pressure P11 and the anode pressure P11 has reached a first time period $\Delta t1$ (sufficient for the boosting of the anode pressure P11 to the target anode pressure P1), a second time period $\Delta t2$ (sufficient for the boosting of the anode pressure P11 to the target anode pressure P2) or a third time period $\Delta t3$ (sufficient for the boosting of the anode pressure P11 to the target anode pressure P3) (S105: YES, S109: YES, S112: YES).

In this case, it is desirable that the first through third time periods $\Delta t2$-$\Delta t3$ be set considering the minimum value of the anode pressure P11 at the start of the pressure boosting (e.g., anode pressure P11 in the idling state). For example, each of the first through third time periods $\Delta t1$-$\Delta t3$ may be set at a time length necessary for the boosting of the anode pressure P11 in the idling state to arrive at the target anode pressure (P1-P3).

Incidentally, while the first through third time periods $\Delta t1$-$\Delta t3$ can be set equally ($\Delta t1 = \Delta t2 = \Delta t3$) as shown in FIG. 8 by properly setting the target revolving speeds R1-R3 of the compressor 131 and the target opening degree $\theta 1$ of the back pressure valve 132 in the above embodiment, the first through third time periods $\Delta t1$-$\Delta t3$ increase in the following order $\Delta t1 < \Delta t2 < \Delta t3$ in cases where the revolving speed of the compressor 131 is not raised (kept at the target revolving speed R0), for example, since the necessary time increases with the increase in the target anode/cathode pressure (P1→P2→P3).

While the needle 21 of the ejector 1 in the above embodiment has the channel 25 inside and the hydrogen supplied from the hydrogen tank 121 flows through the channel 25 and then flows into the nozzle 11 through the communicating holes 28 as shown in FIGS. 2 and 3, it is also possible to form the bearing 26 in a greater thickness, to form communicating holes in the axial direction through the circumferential part of the bearing 26, and to let the hydrogen from the hydrogen tank 121 flow into the nozzle 11 through the communicating holes of the bearing 26. In this case, it is desirable to arrange multiple communicating holes (formed through the circumferential part of the bearing 26 in the axial direction) in the circumferential direction (at 60-degree intervals, for example).

While the secondary-side pressure of the ejector 1 (anode pressure) is controlled in the above embodiment by shifting the nozzle 11 relative to the fixed needle 21 based on the pilot pressure as shown in FIGS. 2 and 3, it is also possible to provide the ejector 1 with a fixed nozzle and a movable needle and implement the control of the secondary-side pressure (the change in the area of the nozzle's ejecting hole) by shifting the needle relative to the fixed nozzle based on the pilot pressure.

While the purge valve 125 is opened for discharging the moisture in the above embodiment, it is also possible to open the scavenging gas discharge valve 126 and the drain valve 127 together with or instead of the purge valve 125.

While the ECU 160 in the above embodiment judges whether the electricity generation status of the fuel cell stack 110 is poor or not based on the average cell voltage and/or the lowest cell voltage input from the cell voltage monitor 115, the ECU 160 may also be configured to judge that the electricity generation status is poor when the difference between the electric current instruction value input to the electric power controller (which controls the output (current, voltage) of the fuel cell stack 110) and the actual electric current value detected by the current sensor (electricity generation status detecting unit) is equal to or more than a prescribed value or the difference between the voltage instruction value input to the electric power controller and the actual voltage value detected by the voltage sensor (electricity generation status detecting unit) is equal to or more than a prescribed value.

Also, it is possible to configure the ECU 160 to judge that the electricity generation status is poor when the deviation of the actual I-V (current-voltage) curve of the fuel cell stack 110 from a normal I-V curve (which should be achieved from the current anode pressure, cathode pressure and air flow rate) is equal to or more than a prescribed level.

While the fuel cell system 100 in the above embodiment is assumed to be mounted on a fuel cell electric vehicle (four-wheel, two-wheel, etc.), the fuel cell system 100 may also be mounted on other types of vehicles, trains, ships, etc. Also, the present invention is applicable to stationary-type fuel cell systems.

What is claimed is:
1. A fuel cell system comprising:
 a fuel cell which includes a fuel gas channel and an oxidizer gas channel and generates electricity by using fuel gas supplied to the fuel gas channel and oxidizer gas supplied to the oxidizer gas channel;
 an electricity generation status detecting unit which detects an average cell voltage or a lowest cell voltage of the fuel cell, and compares the average cell voltage or the lowest cell voltage with a threshold value to detect electricity generation status of the fuel cell;
a fuel gas supply unit which supplies the fuel gas;
a fuel gas supply channel which connects the fuel gas supply unit and an inlet of the fuel gas channel;
an ejector which is attached to the fuel gas supply channel;
a fuel off-gas channel which connects an outlet of the fuel gas channel and the ejector;
a discharge valve which is connected to the fuel off-gas channel and is opened for discharging gas in the fuel off-gas channel to the outside;
an oxidizer gas supply unit which supplies the oxidizer gas;
an oxidizer gas supply channel which connects the oxidizer gas supply unit and an inlet of the oxidizer gas channel;
a pressure control unit which controls pressure of the oxidizer gas in the oxidizer gas channel;
a pilot pressure input channel which branches off from the oxidizer gas supply channel and inputs the pressure of the oxidizer gas to the ejector as pilot pressure; and
a control unit programmed to control the discharge valve and the pressure control unit, wherein:
the ejector includes a nozzle which ejects the fuel gas supplied from the fuel gas supply unit, a needle which is placed coaxially with the nozzle, a diffuser in which the fuel gas ejected from the nozzle and fuel off-gas from the fuel off-gas channel are mixed together, and a pressure control mechanism which increases the ejector's secondary-side pressure by increasing area of the nozzle's ejecting hole while keeping the needle in a fixed position relative to the ejector when the pilot pressure input from the pilot pressure input channel rises, the pressure control mechanism including a diaphragm which abuts the nozzle, and
when the average cell voltage or the lowest cell voltage detected by the electricity generation status detecting unit is equal to or less than the threshold value, the control unit opens the discharge valve after raising the pressure of the oxidizer gas and the pilot pressure by using the pressure control unit.

2. The fuel cell system according to claim 1, further comprising a flow rate control unit programmed to control a flow rate of the oxidizer gas flowing through the oxidizer gas channel,
wherein the control unit raising the pressure of the oxidizer gas by using the pressure control unit also raises the flow rate of the oxidizer gas by using the flow rate control unit so that moisture remaining in the oxidizer gas channel is discharged.

3. The fuel cell system according to claim 1, further comprising a pressure sensor which detects gas pressure downstream of the ejector,
wherein when the average cell voltage or the lowest cell voltage is equal to or less than the threshold value, the control unit opens the discharge valve after the gas pressure detected by the pressure sensor has reached a first pressure which is higher than a normal pressure calculated based on an electricity generation demand level.

4. The fuel cell system according to claim 1, wherein when the average cell voltage or the lowest cell voltage is equal to or less than the threshold value, the control unit opens the discharge valve after a lapse of a first time period, which is necessary for raising gas pressure downstream of the ejector to a first pressure which is higher than a normal pressure calculated based on an electricity generation demand level, has passed since the start of the raising of the oxidizer gas pressure by the pressure control unit.

5. The fuel cell system according to claim 3, further comprising a temperature sensor which detects system temperature or ambient temperature of the fuel cell system,
wherein when the average cell voltage or the lowest cell voltage is equal to or less than the threshold value and the temperature detected by the temperature sensor is judged to be equal to or less than a prescribed temperature, the control unit opens the discharge valve after letting the gas pressure downstream of the ejector reach a second pressure which is higher than the first pressure.

6. The fuel cell system according to claim 5, further comprising an electricity generation duration judgment unit programmed to judge whether or not electricity generation duration from the start to the end of the electricity generation by the fuel cell is equal to or less than a prescribed time period,
wherein when the average cell voltage or the lowest cell voltage is equal to or less than the threshold value, the temperature detected by the temperature sensor is judged to be equal to or less than the prescribed temperature, and the electricity generation duration is judged by the electricity generation duration judgment unit to be equal to or less than the prescribed time period, the control unit opens the discharge valve after letting the gas pressure downstream of the ejector reach a third pressure which is higher than the second pressure.

7. The fuel cell system according to claim 4, further comprising a temperature sensor which detects system temperature or ambient temperature of the fuel cell system,
wherein when the average cell voltage or the lowest cell voltage is equal to or less than the threshold value and the temperature detected by the temperature sensor is judged to be equal to or less than a prescribed temperature, the control unit opens the discharge valve after letting the gas pressure downstream of the ejector reach a second pressure which is higher than the first pressure.

8. The fuel cell system according to claim 7, further comprising an electricity generation duration judgment unit programmed to judge whether or not electricity generation duration from the start to the end of the electricity generation by the fuel cell is equal to or less than a prescribed time period,
wherein when the average cell voltage or the lowest cell voltage is equal to or less than the threshold value, the temperature detected by the temperature sensor is judged to be equal to or less than the prescribed temperature, and the electricity generation duration is judged by the electricity generation duration judgment unit to be equal to or less than the prescribed time period, the control unit opens the discharge valve after letting the gas pressure downstream of the ejector reach a third pressure which is higher than the second pressure.

9. The fuel cell system according to claim 2, further comprising a pressure sensor which detects gas pressure downstream of the ejector,
wherein when the average cell voltage or the lowest cell voltage is equal to or less than the threshold value, the control unit opens the discharge valve after the gas pressure detected by the pressure sensor has reached a first pressure which is higher than a normal pressure calculated based on an electricity generation demand level.

10. The fuel cell system according to claim 2, wherein when the average cell voltage or the lowest cell voltage is equal to or less than the threshold value, the control unit opens the discharge valve after a lapse of a first time period, which is necessary for raising gas pressure downstream of the ejector to a first pressure which is higher than a normal pressure calculated based on an electricity generation demand level, has passed since the start of the raising of the oxidizer gas pressure by the pressure control unit.

11. The fuel cell system according to claim 9, further comprising a temperature sensor which detects system temperature or ambient temperature of the fuel cell system, wherein when the average cell voltage or the lowest cell voltage is equal to or less than the threshold value and the temperature detected by the temperature sensor is judged to be equal to or less than a prescribed temperature, the control unit opens the discharge valve after letting the gas pressure downstream of the ejector reach a second pressure which is higher than the first pressure.

12. The fuel cell system according to claim 11, further comprising an electricity generation duration judgment unit programmed to judge whether or not electricity generation duration from the start to the end of the electricity generation by the fuel cell is equal to or less than a prescribed time period, wherein when the average cell voltage or the lowest cell voltage is equal to or less than the threshold value, the temperature detected by the temperature sensor is judged to be equal to or less than the prescribed temperature, and the electricity generation duration is judged by the electricity generation duration judgment unit to be equal to or less than the prescribed time period, the control unit opens the discharge valve after letting the gas pressure downstream of the ejector reach a third pressure which is higher than the second pressure.

13. The fuel cell system according to claim 10, further comprising a temperature sensor which detects system temperature or ambient temperature of the fuel cell system, wherein when the average cell voltage or the lowest cell voltage is equal to or less than the threshold value and the temperature detected by the temperature sensor is judged to be equal to or less than a prescribed temperature, the control unit opens the discharge valve after letting the gas pressure downstream of the ejector reach a second pressure which is higher than the first pressure.

14. The fuel cell system according to claim 13, further comprising an electricity generation duration judgment unit programmed to judge whether or not electricity generation duration from the start to the end of the electricity generation by the fuel cell is equal to or less than a prescribed time period, wherein when the average cell voltage or the lowest cell voltage is equal to or less than the threshold value, the temperature detected by the temperature sensor is judged to be equal to or less than the prescribed temperature, and the electricity generation duration is judged by the electricity generation duration judgment unit to be equal to or less than the prescribed time period, the control unit opens the discharge valve after letting the gas pressure downstream of the ejector reach a third pressure which is higher than the second pressure.

* * * * *